United States Patent [19]

Turner

[11] Patent Number: 5,505,515
[45] Date of Patent: Apr. 9, 1996

[54] FOLDING TRAILER WITH HYDRAULIC LIFT SYSTEM

[75] Inventor: David R. Turner, Berlin, Pa.

[73] Assignee: Fleetwood Enterprises, Inc., Riverside, Calif.

[21] Appl. No.: 196,659

[22] Filed: Feb. 14, 1994

[51] Int. Cl.$^6$ .................................................. B60P 3/355
[52] U.S. Cl. .......................... 296/173; 92/23; 135/88.01; 180/289; 296/26; 296/27; 296/165; 296/171; 318/470
[58] Field of Search ............................... 296/26, 98, 173, 296/175, 168, 171, 165, 170; 135/88.01; 92/23; 180/89.15, 289; 318/466, 467, 470

[56] References Cited

U.S. PATENT DOCUMENTS

| 3,024,059 | 3/1962 | Hagenson | 296/173 |
| 3,363,932 | 1/1968 | Mann | 296/26 |
| 3,506,300 | 4/1970 | Remmert | 296/171 |
| 3,507,535 | 4/1970 | Wallace | 296/173 |
| 3,514,150 | 5/1970 | Wallace | 296/173 |
| 3,947,066 | 3/1976 | Nisley et al. | 52/66 X |
| 4,092,039 | 5/1978 | Lutkenhouse | 296/26 |
| 4,981,317 | 1/1991 | Acosta | 296/98 |

OTHER PUBLICATIONS

Welcome to the World of Hi–Lo, HLT2875C, pp. 15–24.
Hi–Lo—"A Dream to Tow . . . ", Trailer Life.

Primary Examiner—David M. Mitchell
Assistant Examiner—Kia M. Robinson
Attorney, Agent, or Firm—Price, Gess & Ubell

[57] ABSTRACT

An improved folding trailer includes a base member supported by a pair of wheels with a top member movably connected to the base member. A plurality of extendable support units is mounted on the base member and can be hydraulically driven to extend the top member. The hydraulic system is connected to the extendable support units through pulleys and cables and includes a pressure-compensated flow control valve system for hydraulically limiting the retraction rate of these extendable support units.

10 Claims, 4 Drawing Sheets

5,505,515

FOLDING TRAILER WITH HYDRAULIC LIFT SYSTEM

BACKGROUND OF THE INVENTION

1. Field of the Invention

The present invention is directed to a folding camping trailer of the type having a top that closes over folding side walls to provide a compact configuration for transporting behind a driven vehicle and, more particularly, to a folding camping trailer that utilizes an hydraulic system to raise and lower the trailer top in a safe mode of operation.

2. Description of Related Art

A folding camping trailer has existed with side members that are moved into a vertical position as the top is usually hand-cranked to an extended operating level. Folding camping trailers provide a compact configuration for being pulled behind a vehicle, to thereby produce a low aerodynamic profile. When in the compact traveling configuration, the consequences of air pressure created by passing large vehicles and cross winds are substantially reduced. The low center of gravity and its reduced height ensure stability in pulling the trailer and maximum driver viewing to the rear.

A problem has occurred, however, in setting up the folding trailer, since the top must be cranked up by the operator to its extended operative position. People with insufficient upper body strength or endurance to crank up the top have not been successful in utilizing the folding trailer concept. Thus, there is a need in the art to provide an automatic extension and retraction of the top of a folding trailer while satisfying the safety requirements for such a structure.

OBJECTS AND SUMMARY OF THE INVENTION

The present invention is directed to providing an improved folding trailer which comprises a base or frame member having at least a pair of wheels for supporting the base member. A pair of side members are attached in a pivotal manner to the edges of the base member, while a pair of extendable end member units are attached at the forward and rearward portions of the base member. A top or roof member is movably connected to the base member so that it can extend upward approximately 54 inches as a result of four extendable support units mounted on the base member at its respective corners. These extendable support units include a plurality of rectangular telescoping beams that are activated by a cable-and-pulley system. A high-strength cable such as an aircraft cable extends from each of the extendable support units to the piston rod of an hydraulic cylinder. When the cylinder is extended, the piston rod moves the cables at a ratio of 3 to 1 to raise the top or roof member. A battery-operated electrical motor can drive a pump member for providing sufficient hydraulic pressure to be applied to the cylinder. The hydraulic circuit includes a pressure-compensated flow control valve that ensures a maximum retraction rate to the extendable support units so that no matter what the weight of the top member; that is, even if it has auxiliary items such as air conditioning units, it will still retract at a set controlled maximum rate. The hydraulic system further includes a manual control valve that permits an operator adjustment of the retraction rate up to the predetermined maximum retraction rate set by the pressure-compensated flow control valve system.

A safety mechanical latch system, which includes a biasing overcenter spring, provides a mechanical safety lock of the piston rod when in its extended position. An operator-controlled cable can release the mechanical latch system to enable retraction of the top member. The hydraulic system also includes a check valve system which will hold the trailer top in the extended position. Thus, a pair of independent locking systems are provided to ensure safety.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an improved folding trailer with an hydraulic lift system.

Figure 1:
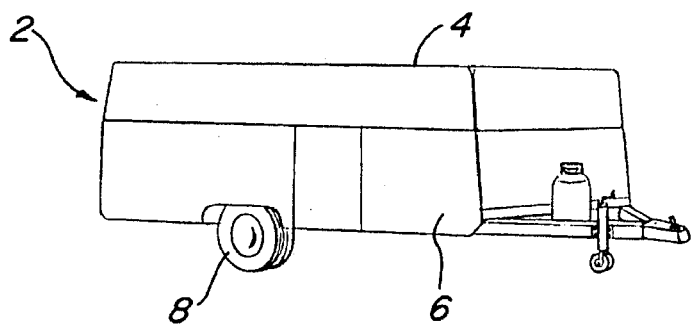
FIG. 1 is a perspective view of the folding trailer in a storage and transportation mode cycle.

Referring to FIG. 1, a folding trailer 2 of the present invention is disclosed in a compact retracted mode of operation for transportation. As can be readily appreciated, the front portion of the frame can have a trailer hitch for pulling the folding trailer 2 behind a vehicle. The folding trailer 2 has a top or roof portion 4 that is movably connected to a bottom or base member 6. The base member 6 can include a wood and plastic floor and side wall construction that is mounted on an undercarriage or frame which includes a tubular steel chassis. Preferably, the base member 6 has a sufficient wall height to accommodate seats, tables, galley, and the like that a person would find of use in a camping environment. The top member 4 can be of an insulated sandwich panel that forms an inverted shell that can extend down over an upper perimeter of the base member 6 in the folded storage mode of operation. A pair of wheels are connected by an axle for moving the folding trailer 2.

Figure 2:
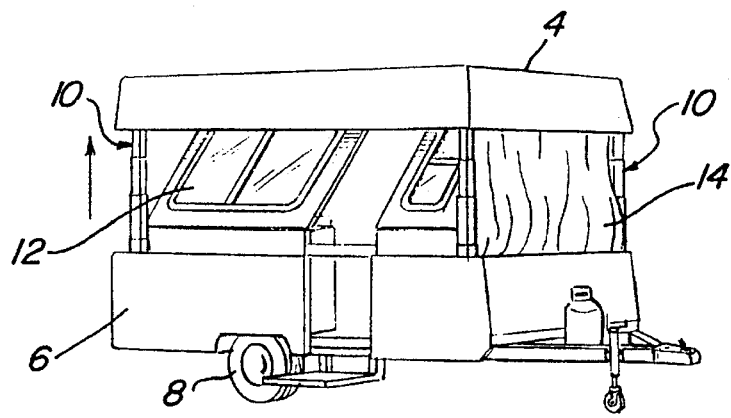
FIG. 2 is a perspective view of the folding trailer with the top being extended.
Figure 3:
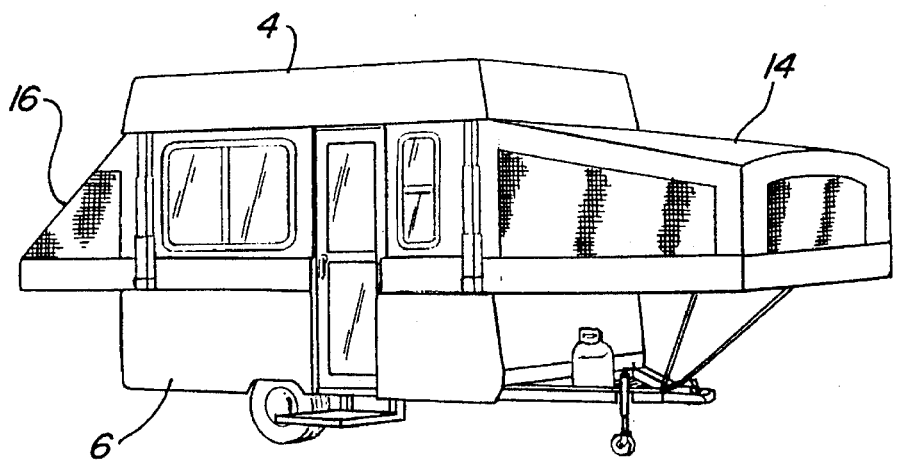
FIG. 3 is a perspective view of the folding trailer in a camping operative mode.

Referring to FIG. 2, the roof member 4 is being extended away from the base member 6 by a series of extendable support units 10 mounted at each of the corners of the rectangular base member 6. Side walls 12, which can include clear vinyl windows, are pivotally mounted to an inner edge of the base member 6 and, through a cable-and-pulley arrangement (not shown), with the pulley attached to the roof or top member 4, can be automatically elevated from approximately a parallel storage position to a vertical operative position to form a side wall, as seen in FIG. 3. Alternatively, the side walls 12 can be formed of a fabric that is waterproof and durable. A forward extendable end unit 14 and a rearward extendable end unit 16 can be slid out from either end of the base member 6 to provide sleeping compartments. Aluminum bed frames can support the bed units and can be extended or retracted into the base member 6. Tenting material can be used to form the canopies in each of the respective end units. As can be appreciated, a folding door is provided to provide access to the interior of the folding trailer.

Figure 4:
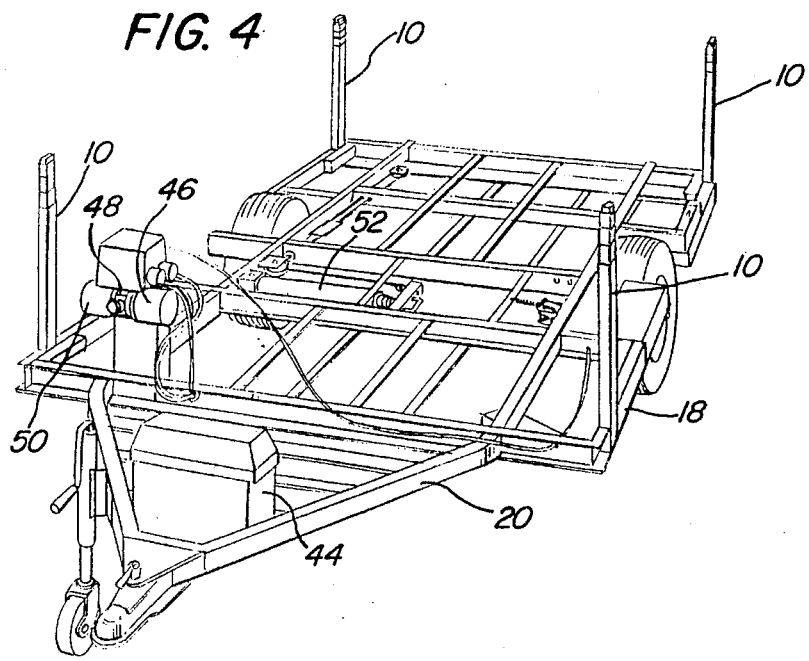
FIG. 4 is a perspective view of the base or frame member.

FIG. 4 provides a perspective view of the undercarriage perimeter 18 and the tubular steel chassis 20. The individual lift systems for extendable support units 10 are mounted on the undercarriage perimeter 18 of the corners of the base member 6.

Figure 5:
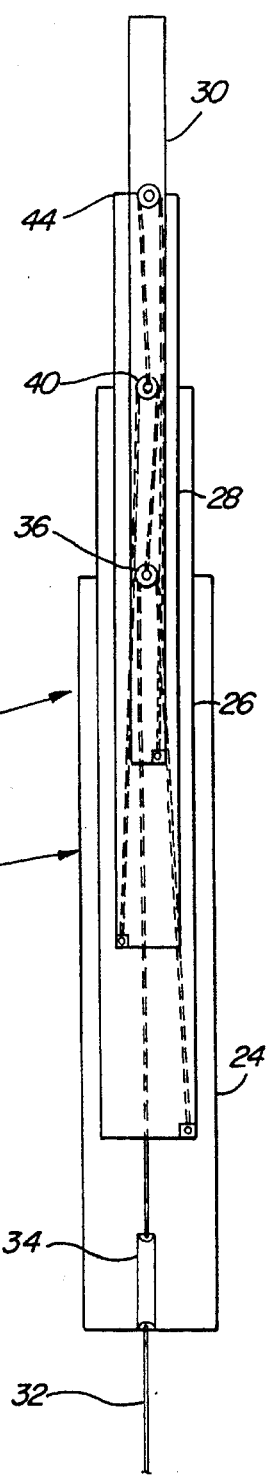
FIG. 5 is a front view of an extendable support unit.
Figure 6:
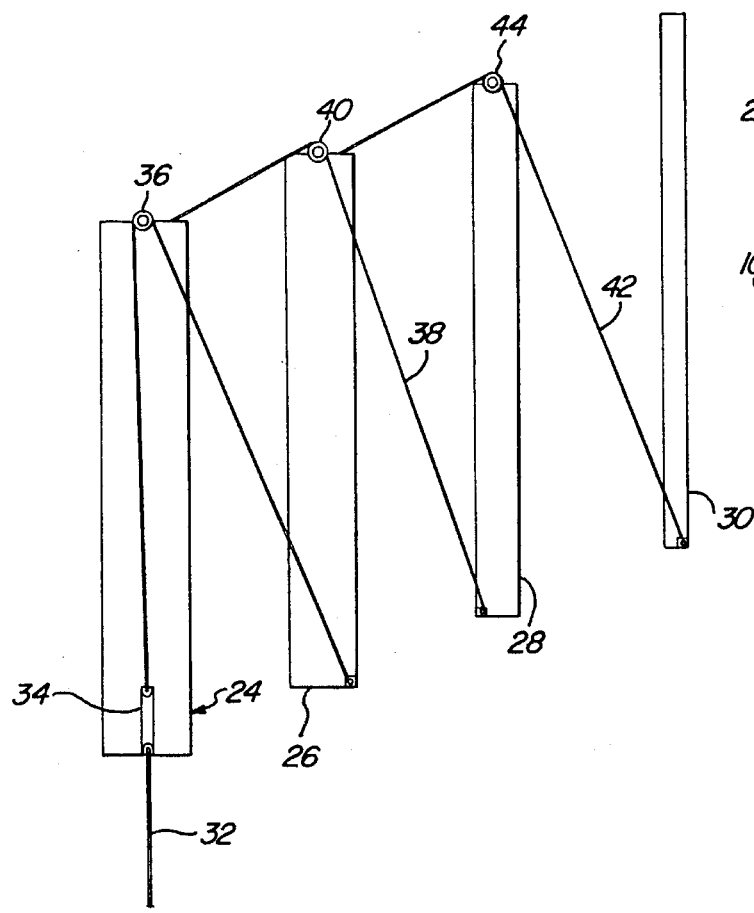
FIG. 6 is a schematic exploded view to illustrate the operation of the extendable support unit.

Referring to FIG. 5, an extendable support unit 10 is disclosed and comprises a series of telescoping rectangular beams 22. The first rectangular beam 24 is permanently mounted to extend to approximately the top of the base member 6. The second rectangular beam 26 is movably mounted within the static rectangular beam 24 and is directly connected to a ⅛-inch-diameter stainless steel aircraft cable 32. A pulley 34 changes the direction of the cable 32 so that it extends over a second pulley 36 mounted at the top of the first rectangular beam 24. The cable 32 is connected to a bottom surface of the second rectangular beam 26. A second cable 38 is mounted to the bottom of a third rectangular beam 28 that is journalled and movably mounted within the second rectangular beam 26. The cable 38 extends over a pulley 40, with the cable 38 attached to the top of the first rectangular beam 24. Another cable 42 is attached to the bottom of the final or fourth rectangular beam 30. The rectangular beam 30 is journalled and movably mounted within the third rectangular beam 28. The cable 42, attached to the bottom of the rectangular beam 30, extends over a pulley 44 mounted at the top of the third rectangular beam and is attached to the top of the second rectangular beam 26. As a result of the mounting of each of the respective pulleys and their cables, when the power cable 32 is moved, a corresponding movement is imposed upon each of the second, third, and fourth rectangular beams. However, because these beams are also interconnected with additional cables and pulleys, each cable has the effect of extending its respective rectangular beam an additional amount of movement. Thus, each single unit of displacement, such as a one-inch displacement of the cable 32, will result in a total displacement of the upper end of rectangular unit 30 by three inches. In the preferred embodiment, the cable 32 is moved 18 inches, while each of the extendable support units is moved 54 inches. Thus, the roof or top member 4 will provide more than ample head room for an adult within the folding-trailer 2.

Figure 7:
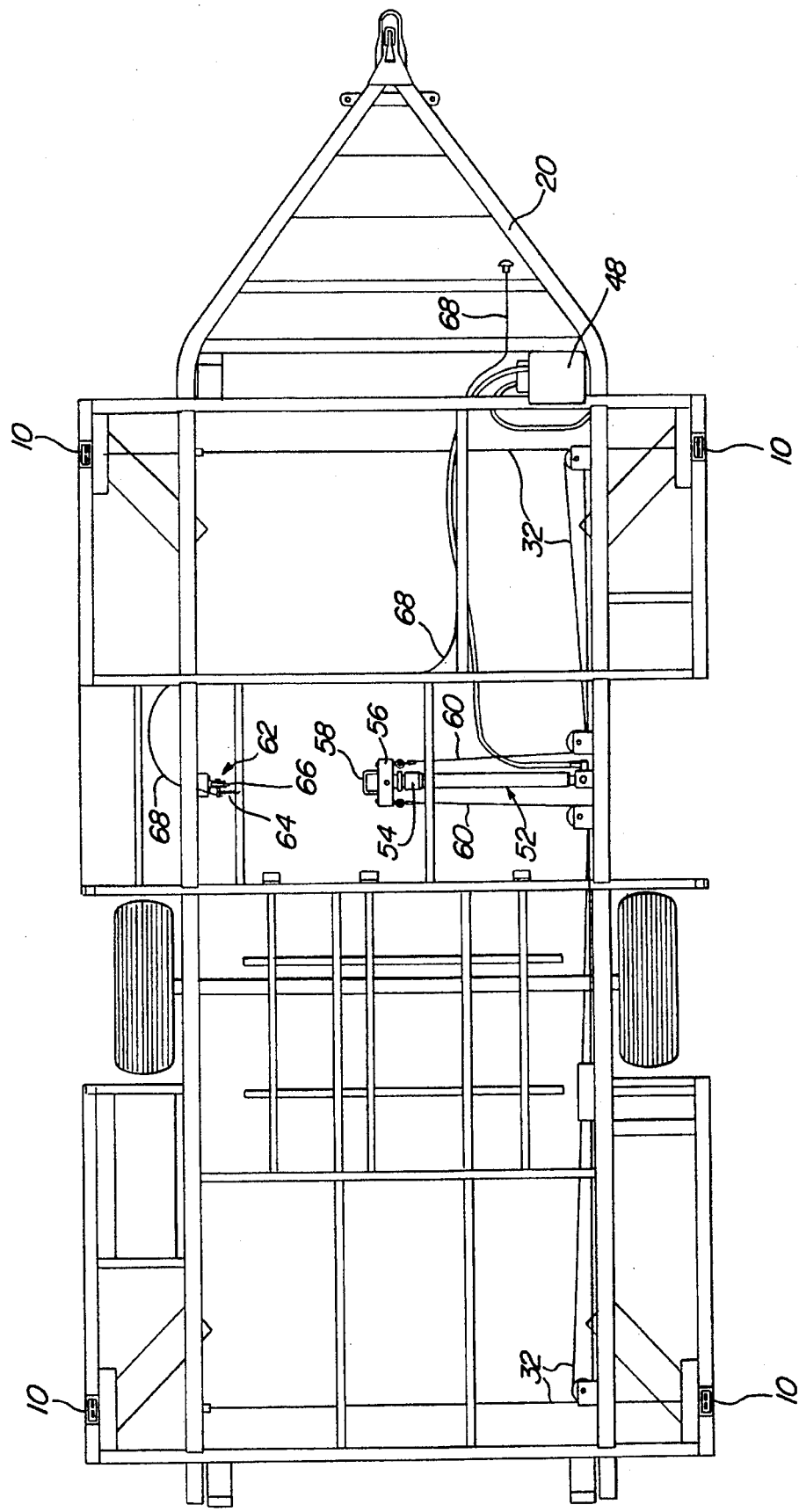
FIG. 7 is a plan view of the chassis and frame of the base member.

Referring to FIG. 4, a 12-volt DC storage battery 44 is connected to an electric motor 46 that can drive an hydraulic pump 48. A return reservoir 50 can be mounted to the pump 48. The pump 48 is connected to an hydraulic cylinder assembly 52. The piston rod 54 extends to one end of the hydraulic cylinder. As can be seen in FIG. 7, a crossbar 56 is mounted at the end of the piston rod 54 and carries a retaining U-shaped bar 58. The crossbar 56 also mounts the ends of a plurality of cables 60, such as the cable 32. These cables travel around a series of pulleys mounted on the undercarriage perimeter 18 to each of the extendable support units 10 mounted in each corner of the base member 6.

Figure 8:
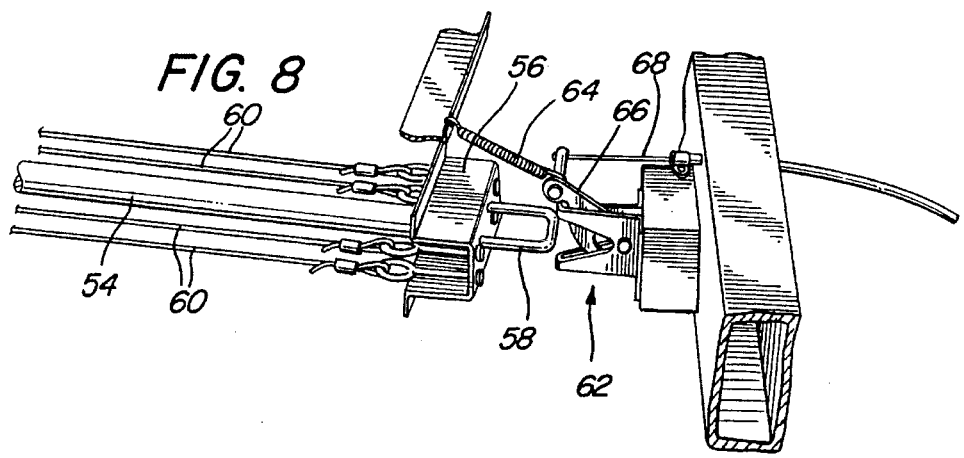
FIG. 8 is a perspective view of the piston rod, retaining bar, and mechanical latch mechanism in an open position.
Figure 9:
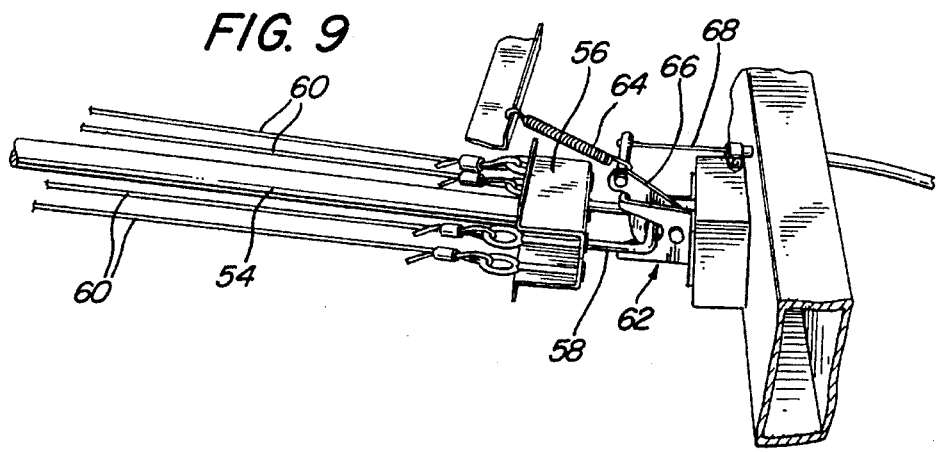
FIG. 9 is a perspective view of the piston rod, retaining bar, and mechanical latch mechanism in a closed position.

The positioning of the hydraulic cylinder assembly 52 permits the piston rod 54 to travel across the central portion of the chassis 20 and engage a latching mechanism 62, shown in FIGS. 7, 8, and 9. A spring member 64 is mounted to a support bar to provide an over-center position for capturing the U-shaped bar 58 with a latching lever 66. The latching lever 66 is attached to a cable 68 which can be mechanically operated by the operator to release the mechanical latch. FIG. 8 discloses the relationship of the U-shaped bar 58 and latching lever 66 prior to being captured by the latching mechanism 62. FIG. 9 shows the latching mechanism 62 firmly holding the piston rod 54 in an extended position so that the top or roof member 4 is locked at its uppermost position.

Figure 10:
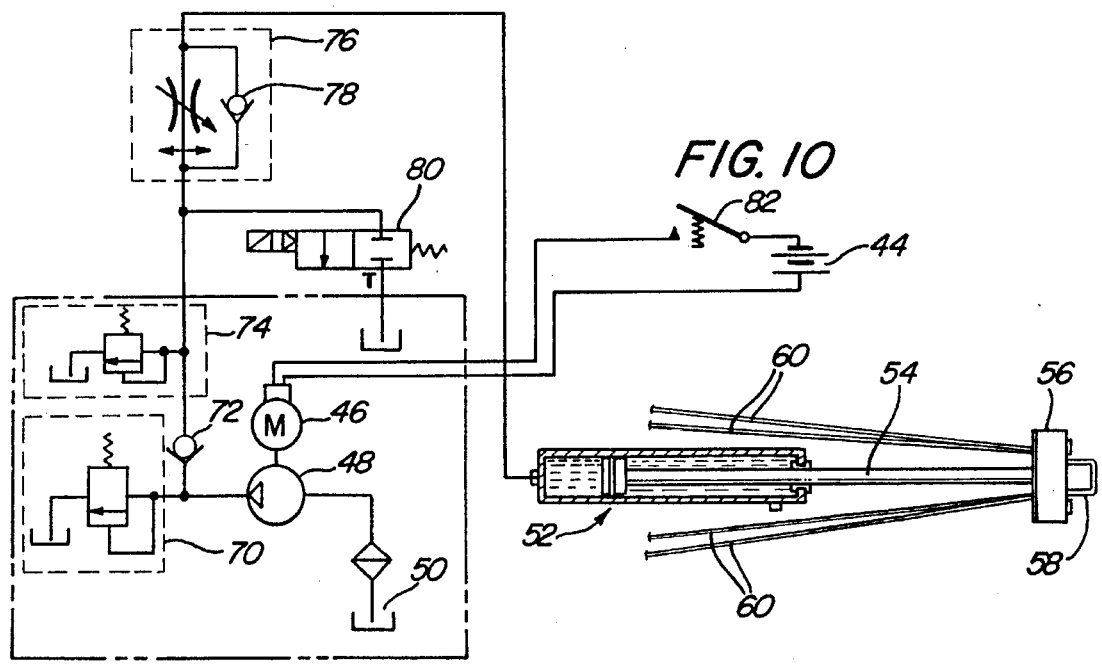
FIG. 10 is a schematic view of the hydraulic system.

Referring to FIG. 10, a schematic of the hydraulic circuit is disclosed. The pump 48 is connected to a reservoir 50 and is driven by the electric motor 46. A pressure relief valve assembly 70 protects the pump 48 and the motor 46 from being overextended by permitting any extraordinary pressure to be released from the hydraulic system and returned to the reservoir 50. For example, if the top member 4 became jammed against a physical obstacle, the pressure relief valve assembly 70 would prohibit damage to the hydraulic system. A check valve 72 will hold an hydraulic pressure load imposed on the hydraulic piston and cylinder assembly 52 so that a double safety feature is provided when the roof or top member 4 is extended to its uppermost position. Thus, the top member 4 will be held in the extended position, both by the hydraulic pressure, and also by the mechanical latching mechanism 62. A temperature relief valve assembly 74 is designed to relieve any abnormal pressure loads existing on the downstream side of the load-holding check valve 72. For example, if the top member 4 is extended in the evening in a cool environment, and then subsequently is subjected to abnormally high daytime temperatures, any expansion in the volume of the hydraulic fluid creating extraordinary pressure will be addressed by the temperature relief valve assembly 74.

A pressure compensated flow control valve assembly 76 has a metered orifice that will ensure a limitation to the maximum retraction rate of the extendable support units 10. Thus, even if the top member 4 is carrying considerable weight, e.g., air conditioners, etc., the maximum lowering rate will be limited by the pressure compensated flow control valve assembly 76. A parallel flow path is controlled by the check valve 78 so that during the raising of the top member 4, there will be no limitation from the pressure compensated flow control valve assembly 76 on the extension rate. Conversely, when the top member 4 is being lowered based on a gravity system, the check valve 78 will close and the retraction rate will be controlled to a maximum level by the pressure compensated flow control valve assembly 76.

A manual control valve 80 permits the operator to adjust the retraction rate up to the limit of the pressure compensated flow control valve assembly 76 retraction rate. The manual control valve 80 is spring biased to a closed position. A threaded knob on the control valve 80 can be manually moved to force an opening in the fluid flow return line to the reservoir 50.

The motor 46 is connected to the DC power 44 through a spring-biased toggle switch 82, which provides a safety feature. That is, the operator can only operate the hydraulic power system by continuing pressure on the toggle switch 82 to close the contact. Once this pressure is removed, the power system stops and the top or roof member 4 will then remain at whatever height it is at that time, since the internal load-holding check valve 72 will freeze the system so that it is hydraulically locked.

The manual control valve 80 can be adjusted by the operator to control the speed at which the top member 4 retracts to the maximum retraction rate of the pressure compensated flow control valve assembly 76.

As can be readily appreciated, an operator can conveniently set up the travel trailer 2 of the present invention with minimal effort by activating the toggle switch 82. The motor 46 will drive the pump 48 to extend the piston rod in the hydraulic cylinder assembly 52. A piston rod 54 will pull the respective cables 60 to each of the extendable support units 10, which will provide a multiplication of a factor of 3 in the extension of the support units. As the support units 10 are driven upward by the hydraulic pressure, the side walls 12 will be pulled upward to an operative vertical position through the pulleys and cables attached to the top member 4. The operator can then extend the forward extendable end unit 14 and the rearward extendable end unit 16 and install the appropriate mattresses to establish the bed configuration. Appropriate manual supports (not shown) can be used to balance the folding trailer 2 in a stable horizontal position, as well known in this art.

When the operator wishes to retract the folding trailer's top member 4, he or she can simply utilize the effect of gravity through the bleeding of hydraulic pressure with the manual control valve 80. Thus, a safe and efficient hydraulic system is utilized to provide an improved folding trailer assembly.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved folding trailer comprising:

a base member having at least a pair of wheels;

a top member movably connected to the base member;

a plurality of extendable support units mounted on the base member and connected to the top member;

hydraulic means mounted on the base member and connected to the support units for extending the support units to elevate the top member to an inhabitable height above the base member, including a pressure-compensated flow control valve system for hydraulically limiting the retraction rate of the extendable support units as the top member is retracted to a transportable position adjacent the base member, including a hydraulic cylinder and a piston rod and cables interconnected to the piston rod and to each extendable support unit;

control means for activating the hydraulic means, including an operator switch member that is biased to an open position and requires the application of an external force by the operator to maintain the activation of the hydraulic means; and mechanical means for locking the extendable support units in an extended position, including a mechanical latching mechanism for engaging the piston rod at an extended position to lock in that position, a mechanical release cable connected to the latching mechanism to permit an operator to release the piston rod for retraction of the top member, and an overcenter-mounted spring means to bias the mechanical latching mechanism to an overcenter lock position in one direction and an overcenter release position in another direction, whereby the folding trailer can be safely extended and retracted.

2. The invention of claim 1 wherein each extendable support unit comprises a plurality of telescoping beams interconnected by pulleys and cables.

3. The invention of claim 1 further including a pair of side members pivotally connected to the base member for folding to a storage position approximately parallel to the base member and an operative position traverse to the base member.

4. The invention of claim 3, further including a pair of extendable end member units, each end member unit including a flexible canopy.

5. An improved folding trailer comprising:

a base member having at least a pair of wheels;

a top member movably connected to the base member;

a pair of extendable end member units, each end member unit including a flexible canopy;

a pair of side members pivotally connected to the base member for folding to a storage position approximately parallel to the base member and an operative position traverse to the base member;

a plurality of extendable support units mounted on the base member and connected to the top member, each extendable support unit including a plurality of telescoping beams interconnected by pulleys and first cables;

hydraulic means mounted on the base member, including a hydraulic cylinder, and a single piston rod;

a plurality of second cables, connected to the support units for extending the support units to elevate the top member to an inhabitable height above the base member and connected to the single piston rod, the hydraulic means further including a pressure-compensated flow control valve system for hydraulically limiting the retraction rate of the extendable support units as the top member is retracted to a transportable position adjacent the base member;

mechanical locking means for engaging the piston rod in an extended position and locking it at that position;

means for releasing the mechanical locking means by an operator; and control means for activating the hydraulic means, including a pump, an electric motor to drive the pump, and a switch for operating the electric motor, wherein the switch is biased to an open position and must be manually pressured to remain in an operative closed position.

6. An improved folding trailer comprising;

a base member having at least a pair of wheels;

a top member movably connected to the base member;

a plurality of extendable support units mounted on the base member and connected to the top member;

hydraulic means mounted on the base member and connected to the support units for extending the support units to elevate the top member to an inhabitable height above the base member, including a pressure regulated flow control valve system for hydraulically limiting the retraction rate of the extendable support units as the top member is retracted to a transportable position adjacent the base member, a hydraulic cylinder and a piston rod and cables interconnected to the piston rod and to each extendable support unit;

a mechanical latching mechanism for engaging the piston rod at an extended position to lock in that position and a mechanical release cable connected to the latching mechanism to permit an operator to release the piston rod for retraction of the top member;

an overcenter-mounted spring means to bias the mechanical latching mechanism to an overcenter lock position in one direction and an overcenter release position in another direction; and control means for activating the hydraulic means.

7. The invention of claim 6, further including a manual control valve for providing a variable flow rate to the hydraulic means.

8. The invention of claim 6, further including a pair of side members pivotally connected to the base member.

9. The invention of claim 6, further including a pair of extendable end member units, each end member unit including a flexible canopy.

10. The invention of claim 6 wherein each extendable support unit comprises a plurality of telescoping beams interconnected by pulleys and cables.

* * * * *